United States Patent
Parmenter et al.

(10) Patent No.: US 10,445,309 B2
(45) Date of Patent: Oct. 15, 2019

(54) MANAGING RECORD FORMAT INFORMATION

(75) Inventors: David W. Parmenter, Newton, MA (US); Joel Gould, Arlington, MA (US); Jennifer M. Farver, Chicago, IL (US); Robert Freundlich, Sudbury, MA (US); Joyce L. Vigneau, Stoneham, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 12/945,094

(22) Filed: Nov. 12, 2010

(65) Prior Publication Data

US 2011/0153667 A1    Jun. 23, 2011

Related U.S. Application Data

(60) Provisional application No. 61/260,997, filed on Nov. 13, 2009.

(51) Int. Cl.
*G06F 17/30* (2006.01)
*G06F 16/23* (2019.01)

(52) U.S. Cl.
CPC .............................. *G06F 16/2365* (2019.01)

(58) Field of Classification Search
CPC ................................................ G06F 16/2365
See application file for complete search history.

(56) References Cited

U.S. PATENT DOCUMENTS 6,745,176 B2    6/2004   Probert, Jr. et al.
2001/0056362 A1 * 12/2001  Hanagan .............. G06Q 10/063
                                            705/7.11

(Continued)

FOREIGN PATENT DOCUMENTS

| CN | 1053852 | 8/1991 |
| CN | 1298523 | 10/2001 |

(Continued)

OTHER PUBLICATIONS

International Search Report & Written Opinion, Patent Cooperation Treaty, PCT/US10/56530, dated Jan. 14, 2011, 7 pages.

(Continued)

*Primary Examiner* — Alicia M Willoughby
(74) *Attorney, Agent, or Firm* — Fish & Richardson P.C.

(57) ABSTRACT

Data is prepared for processing in a data processing system using format information. Data is received that includes records that have values for fields over an input device or port. A target record format for processing the data is determined. Multiple records are analyzed according to validation tests to determine whether the data matches candidate record formats. Each candidate record format specifies a format for each field, and each validation test corresponds to at least one candidate record format. In response to receiving results of the validation tests, the target record format is associated with the data based on at least one of: a candidate record format for which at least a partial match was determined according to at least one validation test, a parsed record format selected according to a data type associated with the data, and a constructed record format generated from an analysis of data characteristics.

17 Claims, 9 Drawing Sheets

(56) References Cited

U.S. PATENT DOCUMENTS

| | | | |
|---|---|---|---|
| 2004/0139076 A1* | 7/2004 | Pendleton | 707/10 |
| 2005/0192844 A1* | 9/2005 | Esler | G06Q 10/10 |
| | | | 705/3 |
| 2006/0015511 A1 | 1/2006 | Sattler et al. | |
| 2006/0136422 A1 | 6/2006 | Matveief et al. | |
| 2007/0276858 A1* | 11/2007 | Cushman et al. | 707/102 |
| 2008/0215528 A1* | 9/2008 | Sedlar | 707/1 |
| 2009/0024639 A1* | 1/2009 | Steinmann | 707/100 |
| 2009/0073494 A1 | 3/2009 | Takemoto | |
| 2011/0029805 A1* | 2/2011 | Pericin | G06F 11/0715 |
| | | | 714/2 |

FOREIGN PATENT DOCUMENTS

| | | |
|---|---|---|
| JP | 2001-101049 | 4/2001 |
| JP | 2008-305348 | 12/2008 |
| WO | WO2006/046665 | 4/2006 |

OTHER PUBLICATIONS

Japanese Office Action, JP2012-539018, dated May 14, 2014, 4 pages (English Translation).
Chinese Office Action, CN201080061493, with English Translation, dated Sep. 22, 2014 (58 pages).
Korean Office Action (with English translation) issued in Application 10-20127013690, dated Oct. 21, 2015, 12 pages.
Canadian Office Action in Application No. 2,779,087, dated Mar. 21, 2016 (5 pages).

* cited by examiner

MANAGING RECORD FORMAT INFORMATION

CROSS-REFERENCE TO RELATED APPLICATIONS

This application claims priority to U.S. Application Ser. No. 61/260,997, filed on Nov. 13, 2009, incorporated herein by reference.

BACKGROUND

This description relates to managing record format information.

Organizations manage data from multiple different systems. System may produce datasets of data in a format native to the system. Other systems produce datasets using a standard format, such as a comma separated file or an XML document. Generally, even when the format of the dataset is standard the records and fields within the dataset are specific to the system.

Some systems accept datasets provided by other systems through an import mechanism. The import converts the external dataset into a format native to the system for processing. Other systems create a record format which describes the dataset sufficiently to permit the system to process the external dataset without necessarily requiring conversion.

SUMMARY

In one aspect, in general, a method for preparing data for processing in a data processing system based on format information in a data storage system. Data is received that includes records that each has one or more values for respective fields over an input device or port. A target record format for processing the data in the data processing system is determined. Multiple records in the data are analyzed according to multiple validation tests to determine whether the data matches one or more candidate record formats stored in the data storage system. Each candidate record format specifies a format for each field of a group of one or more fields, and each validation test corresponds to at least one candidate record format stored in the data storage system. In response to receiving results of the validation tests, the target record format is associated with the data based on at least one of: a selected candidate record format for which at least a partial match was determined according to at least one validation test corresponding to the selected candidate record format, a parsed record format generated by a parser selected according to a known data type associated with the data, and a constructed record format generated from an analysis of characteristics of the data.

Aspects can include one or more of the following features.

Associating the target record format with the data based on the parsed record format in response to none of the validation tests determining at least a partial match to one or more of the candidate record formats. The known data type associated with the data may be known based on a file type of the data. The file type of the data may correspond to a file extension. Associating the target record format with the data based on the constructed record format in response to: none of the validation tests determining at least a partial match to one or more of the candidate record formats, and not having a known data type associated with the data. Generating the constructed record format from an analysis of characteristics of the data may include recognizing tags in the data and parsing the data to determine multiple records based on the recognized tags. Generating the constructed record format from an analysis of characteristics of the data may include recognizing delimiters in the data and parsing the data to determine multiple records based on the recognized delimiters. Generating the constructed record format from an analysis of characteristics of the data may include recognizing that the data is in a substantially binary form without tags or delimiters indicating values of multiple records and receiving one or more field identifiers from a user interface. Analyzing the multiple records in the data according to a first validation test of the multiple validation tests corresponding to a first candidate record format may include applying the first candidate record format to the data to determine values for each record in the formats specified by the first candidate record format for each field. Determining whether the data matches the first candidate record format may include analyzing the determined values for the multiple records according to the first validation test to determine whether a number of valid values is larger than a predetermined threshold. Analyzing determined values for a first record of the multiple records according to the first validation test may include performing a corresponding field test on each determined value for each field. Performing a first field test on a determined value for a first field may include matching a number of characters in the determined value to a predetermined number of characters. Performing a first field test on a determined value for a first field may include matching the determined value to one of multiple predetermined valid values for the first field. The number of valid values may be based on a number of records for which the determined value for a given field passes the field test corresponding to the given field.

In another aspect, in general, a system for preparing data for processing in a data processing system based on format information in a data storage system includes: means for receiving data that includes records that each have one or more values for respective fields over an input device or port; and means for determining a target record format for processing the data in the data processing system. The means for determining the target record format may be configured to: analyze multiple records in the data according to multiple validation tests to determine whether the data matches one or more candidate record formats stored in the data storage system, each candidate record format specifying a format for each field of a group of one or more fields, and each validation test corresponding to at least one candidate record format stored in the data storage system, and, in response to receiving results of the validation tests, associate the target record format with the data based on at least one of: a selected candidate record format for which at least a partial match was determined according to at least one validation test corresponding to the selected candidate record format, a parsed record format generated by a parser selected according to a known data type associated with the data, and a constructed record format generated from an analysis of characteristics of the data.

In another aspect, in general, a computer-readable medium stores a computer program for preparing data for processing in a data processing system based on format information in a data storage system. The computer program includes instructions for causing a computer to receive data that includes records that each have one or more values for respective fields over an input device or port; and determine a target record format for processing the data in the data processing system, including analyzing multiple records in the data according to multiple validation tests to determine whether the data matches one or more candidate record formats stored in the data storage system, each candidate record format specifying a format for each field of a group of one or more fields, and each validation test corresponding to at least one candidate record format stored in the data storage system, and in response to receiving results of the validation tests, associating the target record format with the data based on at least one of: a selected candidate record format for which at least a partial match was determined according to at least one validation test corresponding to the selected candidate record format, a parsed record format generated by a parser selected according to a known data type associated with the data, and a constructed record format generated from an analysis of characteristics of the data.

Other features and advantages of the invention will become apparent from the following description, and from the claims.

DESCRIPTION

Figure 1:
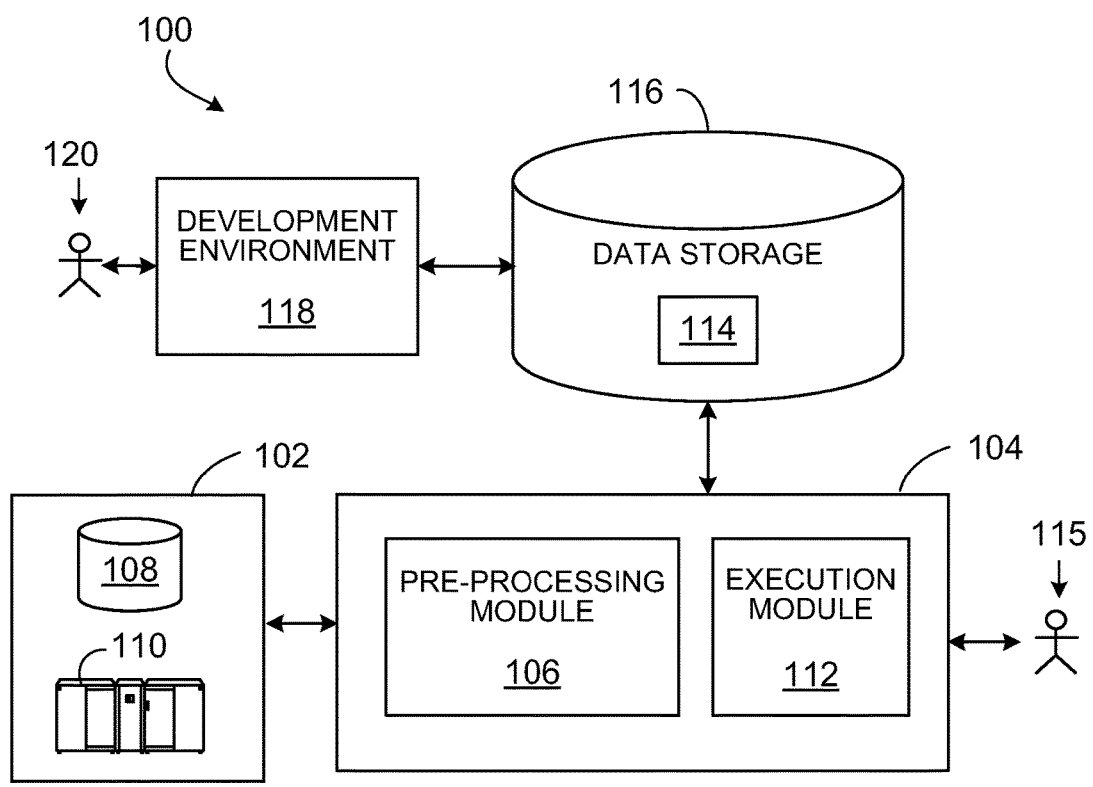
FIG. 1 is a block diagram of a system for executing graph-based computations.

FIG. 1 shows an exemplary data processing system 100 in which the record format management techniques can be used. The system 100 includes a data source 102 that may include one or more sources of data such as storage devices or connections to online data streams, each of which may store data in any of a variety of storage formats (e.g., database tables, spreadsheet files, flat text files, or a native format used by a mainframe). An execution environment 104 includes a pre-processing module 106 and an execution module 112. The execution environment 104 may be hosted on one or more general-purpose computers under the control of a suitable operating system, such as the UNIX operating system. For example, the execution environment 108 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via a local area network (LAN) and/or wide-area network (WAN)), or any combination thereof. In some implementations, the execution module 112 provides an operating system, which may be a parallel operating system running on one or more processors, and the pre-processing module 106 is executed as a program running in that operating system. A user 115 is also able to interact with the execution environment 108 by viewing displayed outputs and entering inputs in a user interface.

The pre-processing module 106 receives data that includes records that each have one or more values for respective fields from the data source 102 and determines a target record format for processing the records using the execution module 112. For example, the pre-processing module 106 determines that the appropriate target record format 114 is already stored in a data storage system 116, or if not, generates the target record format 114 and stores the generated target record format 114 in the data storage system 116. Storage devices providing the data source 102 and the data storage system 116 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104, over a remote connection.

The execution module 112 uses the determined target record format 114 to interpret and process records received from the data source 102. The data storage system 116 is also accessible to a development environment 118 in which a developer 120 is able to develop programs to be executed by the execution module 112 to process the records. The development environment 118 is, in some implementations, a system for developing applications as dataflow graphs that include vertices (components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference.

The pre-processing module 106 can receive data from a variety of types of systems including different forms of database systems. The data may be organized as records having values for respective fields (also called "attributes" or "columns"), including possibly null values. When first reading data from a data source, a target record format that describes the record structure of the records from that data source is not known, though in some circumstances, the pre-processing module 106 may start with some initial format information about records in that data source. The pre-processing module 106 manages a collection of record formats stored in the data storage system 116 to determine whether the records to be processed are described by a stored record format or whether a record format is to be generated. The record format can include a variety of characteristics such as the number of bits that represent a distinct value, the order of fields within a record, and the type of value (e.g., string, signed/unsigned integer) represented by the bits.

Figure 2:
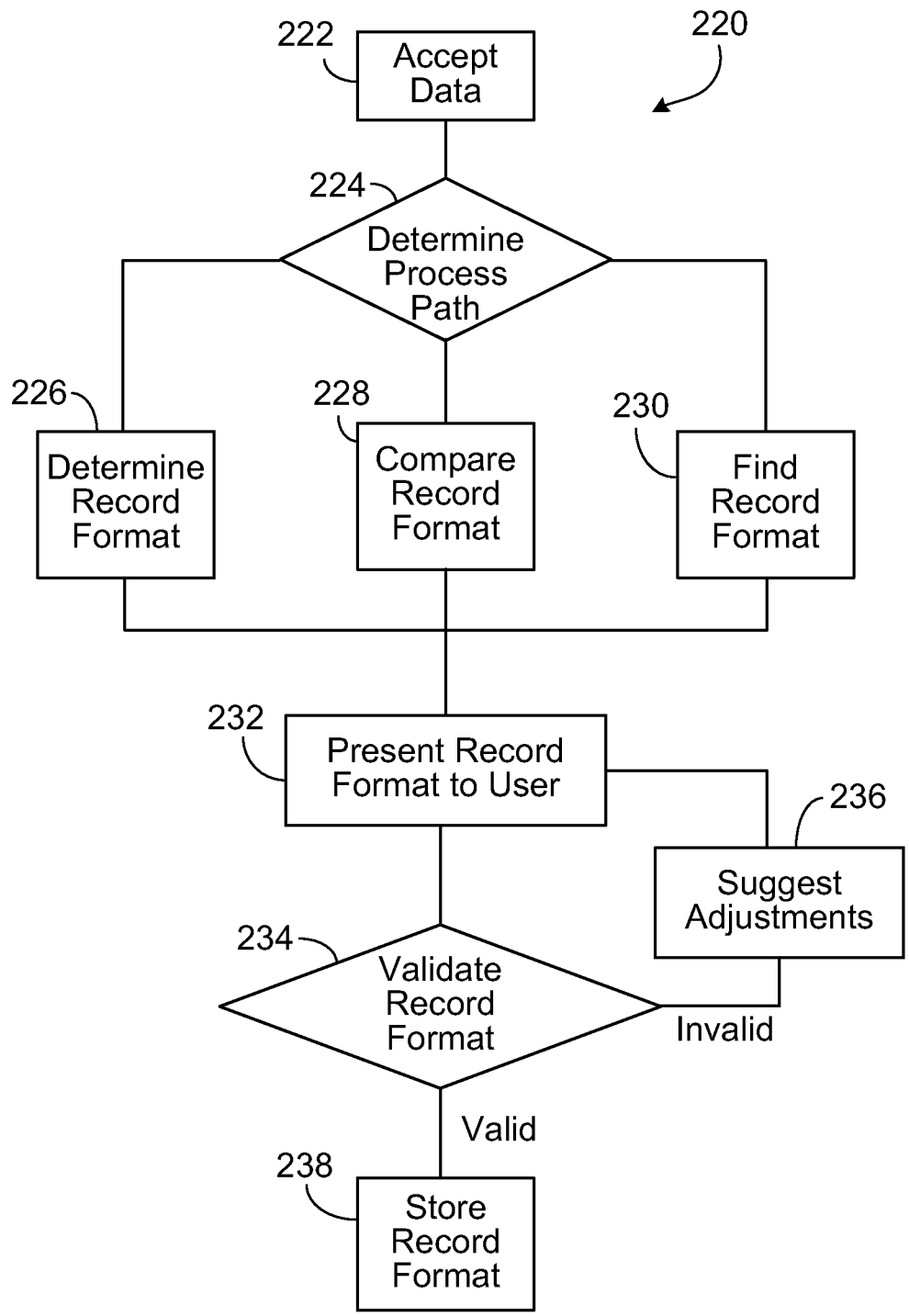
FIG. 2 is a flowchart of an exemplary procedure for managing record format information.

Referring to FIG. 2, a flowchart for a process 220 includes some operations of the pre-processing module 106 for managing record formats. Among other capabilities, the pre-processing module 106 accepts data 222. The data may be received through a file, a database, a user interface, an input port, or any other input device. Among other information, the pre-processing module 106 may receive data including a record format for records from the data source, sample data including one or more records from the data source 102, or both. The sample data can include all the records that are to be processed or a subset of the records.

The pre-processing module 106 may also receive an indication of which operations the pre-processing module 106 is requested to perform.

Operations of the pre-processing module 106 also include determining a process path 224. The pre-processing module 106 may have multiple ways to determine a record format for interpreting records of received sample data. The pre-processing module 106 may determine which process path is appropriate based on whether a potential record format for the sample data is provided as input. In some implementations of the system, the pre-processing module 106 accepts data indicating which process path is preferred.

Along one process path, operations of the pre-processing module 106 include determining a target record format of sample data 226 based on an analysis of the sample data, as described in more detail below.

Along another process path, operations of the pre-processing module 106 include determining a target record format of sample data based on comparing a provided record format to the provided sample data 228. In some cases, the pre-processing module 106 accepts sample data and a provided record format (or an identifier to a stored record format) that potentially corresponds to the accepted sample data. The pre-processing module 106 compares the provided or identified record format to the sample data to determine if the record format represents the structure of the sample data.

Along another process path, operations of the pre-processing module 106 include determining a target record format of sample data based on finding a record format for provided sample data 230. In some cases, the pre-processing module 106 accepts sample data and compares the data to existing record formats in a record format repository (e.g., hosted in the data storage system 116) to discover if any of the record formats correctly represent the structure of the sample data.

Operations also include presenting one or more potential target record formats to the user 232. Once one or more record formats are determined, the record formats may be presented to the user. The user may select a single record format from the plurality of record formats. The user may also modify the record format.

Operations also include validating the target record format 234. Before a record format is accepted by the pre-processing module 106, the pre-processing module may validate the record format against provided sample data.

Operations also include suggesting adjustments to the target record format 236. If a record format is not capable of parsing provided sample data, the pre-processing module 106 identifies the inconsistencies between the record format and the sample data. The inconsistencies may be identified by analyzing the errors which occurred when parsing the sample data. Inconsistencies may also be identified by analyzing the sample data and the record format. The process 220 then makes suggestions to fix the inconsistencies. In some implementations, the process 220 may recommend modifying the record format based on the sample data. For example, if a record format expects a field to be a representation of an integer (e.g., a binary representation of an integer value such as 1, 2, 3, 4, etc. . . . ), and that field in the sample data contains a representation of formatted date (e.g., 1/21/2008, 21/1/2008, 01-JAN-2008, etc.), the process 220 may suggest an adjustment. Because an integer field cannot hold a formatted date and a date field cannot hold an integer, the process 220 may suggest modifying the field to a string which may contain either a date or an integer.

In another example, the process 220 may suggest expanding the range of valid values accepted by the record format.

Operations also include storing the target record format 238. The target record format may be stored in the record format repository.

Figure 3:
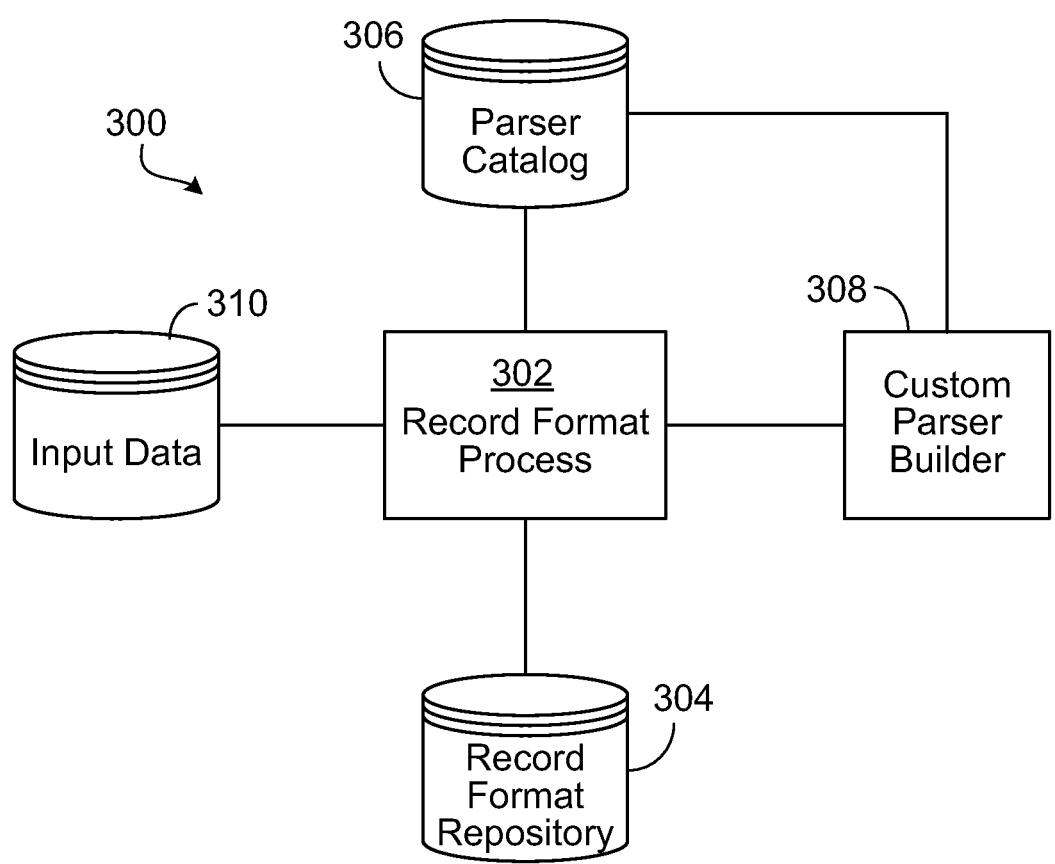
FIG. 3 is a block diagram of an exemplary pre-processing module.

Referring to FIG. 3, a pre-processing module 300 for preparing data for processing in a data processing system includes a mechanism for accepting data. In some cases, the input data may be a database 310. The database 310 may contain the data to be processed by the system 100. In other cases, the database 310 may contain a sample set of data representative of a larger set of data to be processed by the system 100. In still other cases, the database may contain a description of the record format of the data. In other cases, the input data may contain a combination of sample data and a record format. The input data may be communicated to a record format process 302 via a relational database, a flat file, or another mechanism for providing input into the record format process 302, such as data received over a port or via another input device.

The record format process 302 accepts the input data 310 and determines a target record format. In some cases, the input data contains sample data made up of multiple records, each record containing the values for multiple fields. The sample data is analyzed to determine the record format. In other cases sample data is compared to a provided record format. In other cases, the sample data is compared to existing record formats in a record format repository 304 to determine a best fit.

In some cases, the record format process 302 examines a parser catalog 306 which contains parsers to determine if any existing parser is capable of parsing the input data 310 to determine a target record format. If no parser exists to process the input data 310 the record format process 302 may access a custom parser builder module 308 which enables the construction of new parsers for determining the target record format.

A user may be presented with the record format and permitted to adjust the record format. The adjusted record format may be checked against the sample data to ensure that the record format remains compatible with the sample data.

Figure 4:
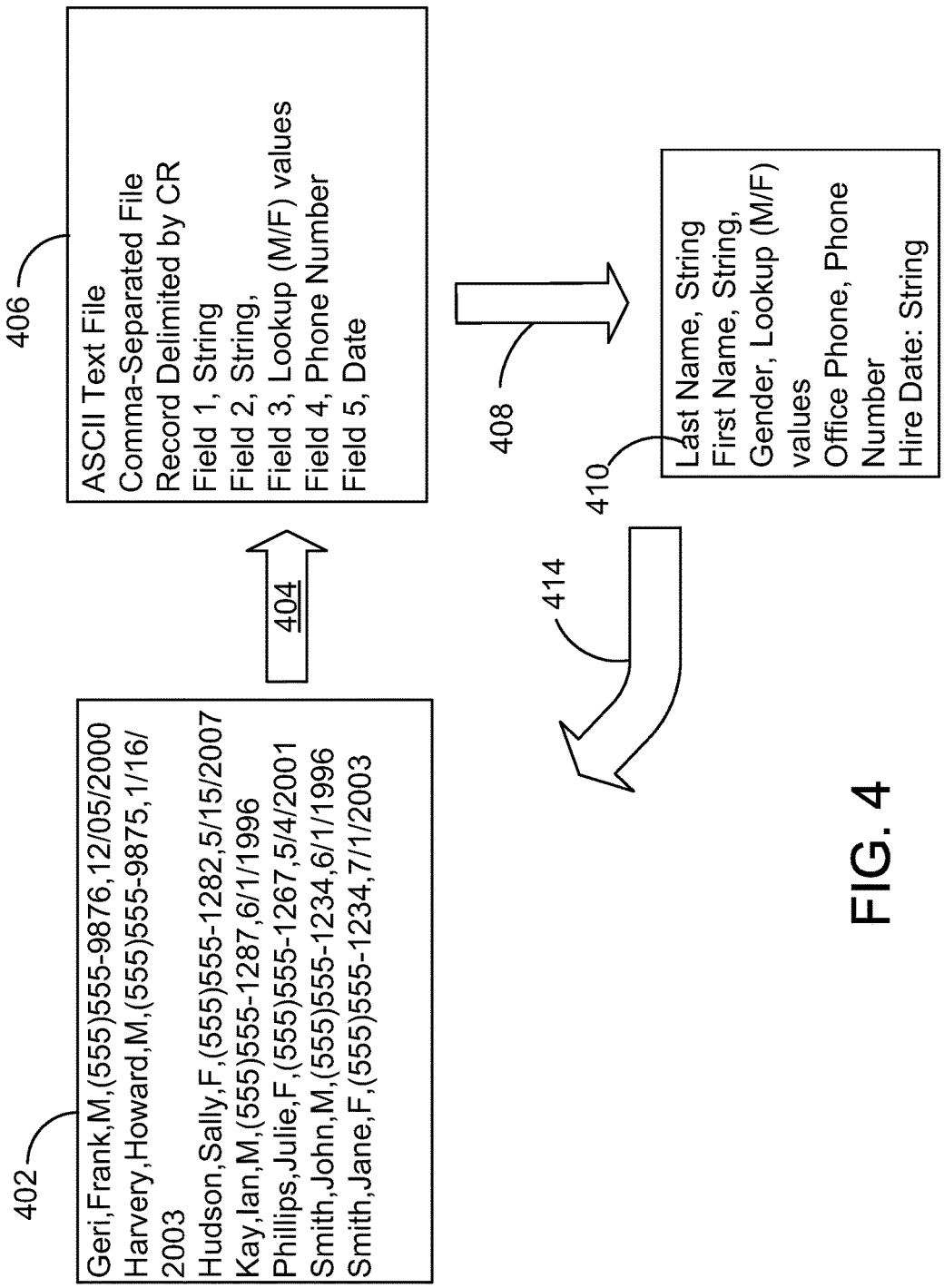
FIG. 4 is a block diagram showing exemplary processing of the pre-processing module determining a record format based on sample data.

Referring to FIG. 4, in some implementations, the system accepts sample data including several sample records. The pre-processing module 106 attempts to identify the record format of the data. In some implementations, if there is no match to an existing stored record format, the data is analyzed to determine how it is encoded. For example, data may be encoded based on an ASCII or EBCDIC character encoding or may be in a binary format. In some implementations, the system then determines if the system has a parser available capable of parsing the data. The system may examine the sample data to determine a record format for the sample data. For example text based sample data may be formatted using delimited fields and records, fixed length fields, tagged data such as Extensible Markup Language (XML) are Standard Generalized Markup Language (SGML). Data may also be in binary form without tags or delimiters to assist in determining the record format. Binary data may be a database, a spreadsheet, word processing document, image, or other binary data. In some implementations, the data type of binary data may be derived based on an examination of the data itself. In other implementations, the data type of binary data may be presumed based on a portion of the name of the file, for example a file extension. The system may determine the fields and records based on parsing the sample format. For example, if the system recognizes delimited fields and records the system separates the data into fields and records based on the delimiters. If the system recognizes tagged data the system parsers the file based on the tags.

In one example, referring to FIG. 4, the system receives a sample data file 402. The data in this example is encoded using ASCII text and is structured using comma separated fields with a carriage return separating different records.

Represented by process arrow 404, the system analyzes multiple records of the sample data to determine a record format 406 for the sample data. In this example, the system identifies five fields: a string, a string, a lookup value, a phone number, and a date. Other data types may also be detected and identified such as integer, floating point number, fixed length text fields, and fixed length decimal numbers. In some implementations, values available for lookup fields may be identified by profiling the values provided by the sample data. In some implementations, once the record format of the sample data is derived, the system may parse the sample data to determine values for each of the data fields. This information, for example, may be used to identify fields which only contain a relatively small number of valid values. In some implementations, the record format of the sample data may be determined based on an analysis of the heuristics of the data. For example, the length of a set of fixed length records will be evenly divisible by the number of records.

In some implementations, once a record format for the sample data is determined, the record format is associated with the data. In another implementation the record format may be displayed to a user and the user may be allowed to modify the record format. Represented by process arrow 414, the modified record format is tested against the sample data to confirm that it is still compatible with the sample data. When the user enters a data type that causes the record format to be unable to parse the sample data, the system may present the errors to the user and suggest changes to the record format which would correct the issue. In this implementation, the record format is associated with the data once the record format is finalized.

Figure 5:
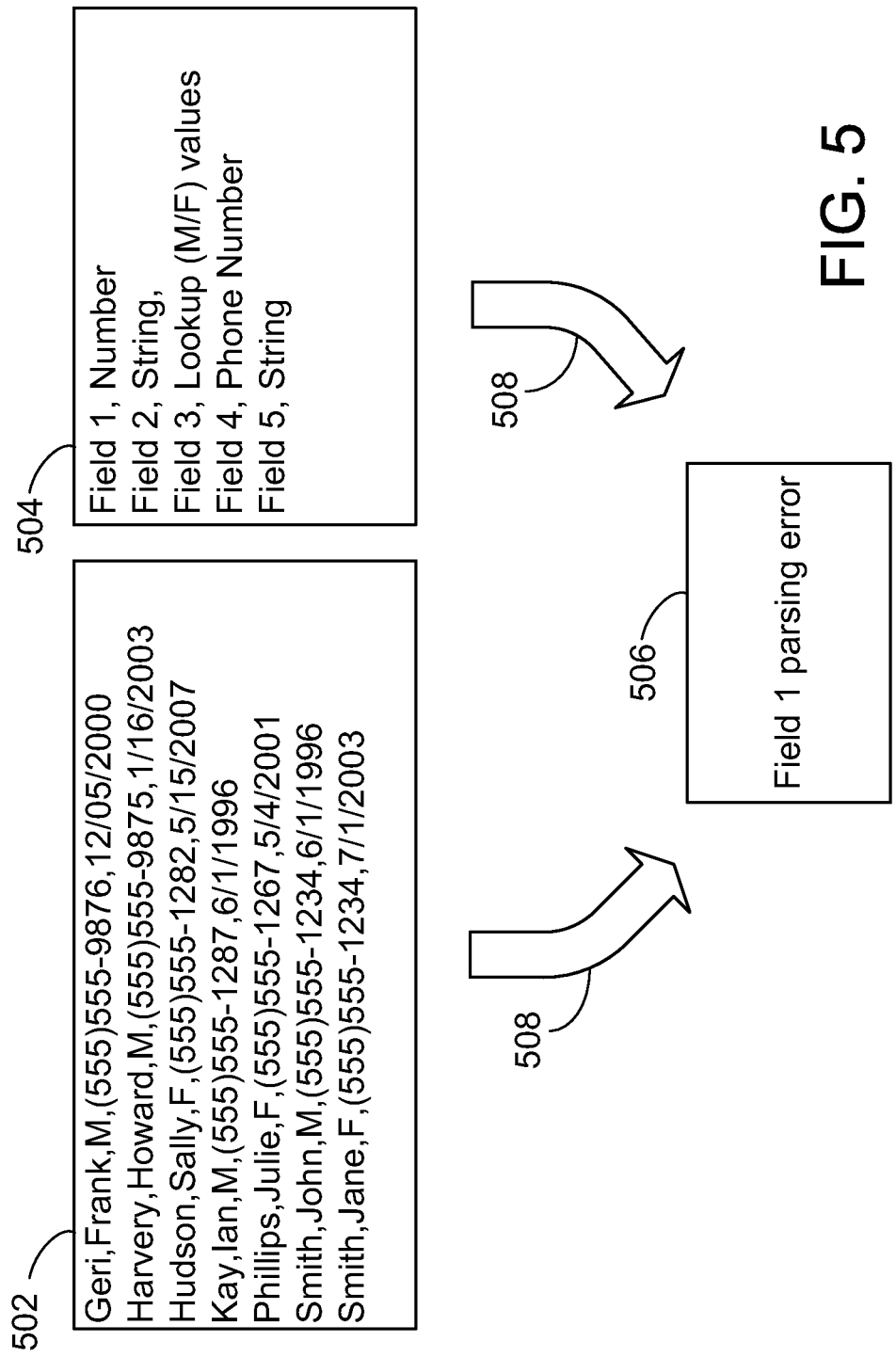
FIG. 5 is a block diagram showing exemplary processing of the pre-processing module validating a record format based on sample data.

Referring to FIG. 5, in some implementations, the system receives a possible record format 504 along with the sample data 502, which may have been provided by a user or may have been identified using a search technique as described herein. There may be some uncertainty about whether the possible record format accurately describes the format of the records in the sample data 502. The possible record format 504 may be a XML document type definition or a section of code defining the physical layout of program data that can be copied from a master and inserted into several different programs such as a COBOL copybook and a Data Manipulation Language (DML) record format.

Represented by process arrows 508, the system attempts to parse the sample data using the possible record format 504, noting any errors that occur during processing. In this example, the first field is defined in the possible record format as a number, while the first field in the sample data 502 is a variable length character field. When the system attempts to parse the data using the record format, an error log 506 is generated and presented to the user. The user is provided with suggestions for resolving the conflict. For example, the user may be presented with a suggestion to change the data type of field 1 to a variable length character field.

Figure 6:
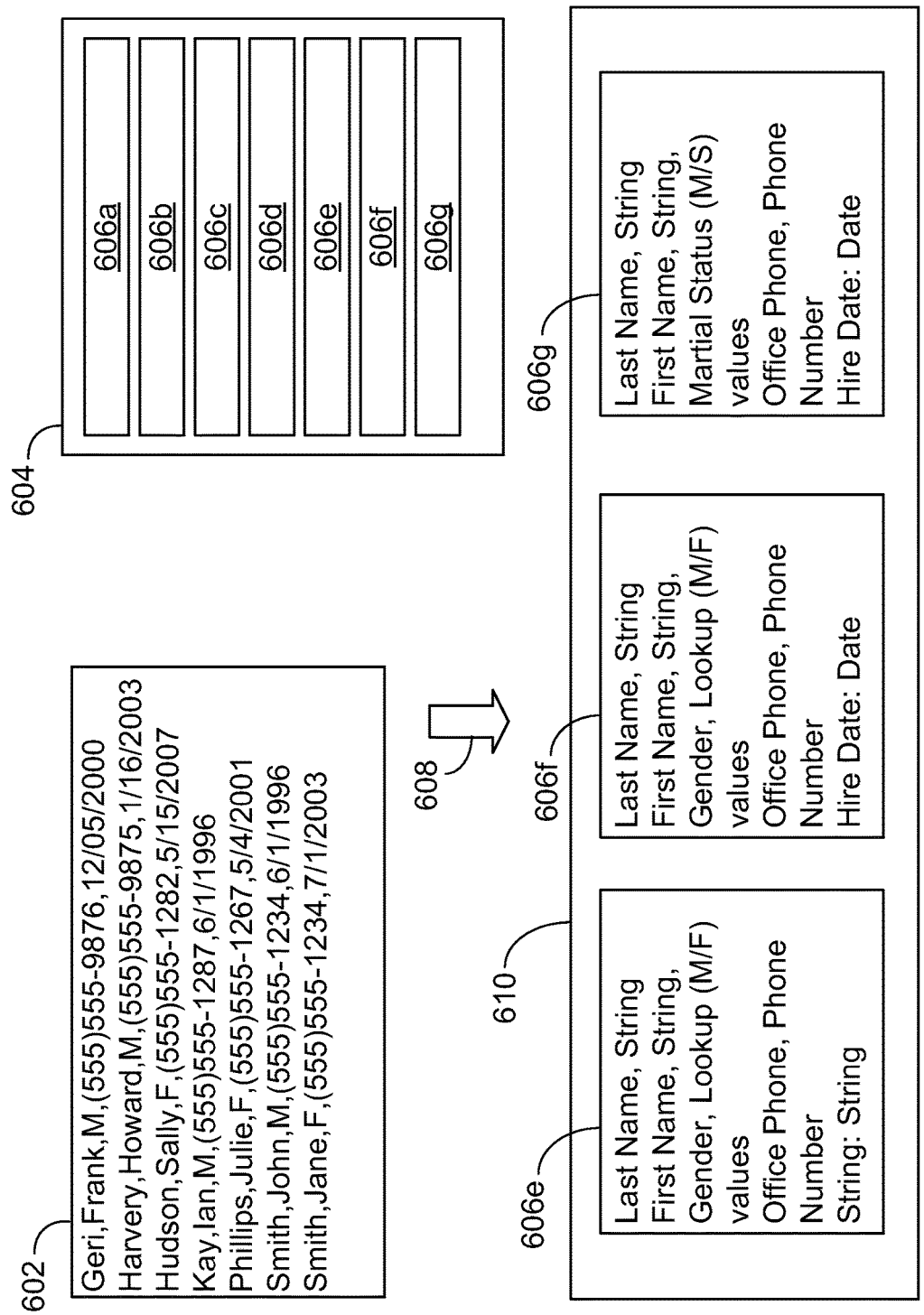
FIG. 6 is a block diagram showing the exemplary processing of the pre-processing module identifying an existing record format based on sample data.

Referring to FIG. 6, in some implementations the system receives sample data 602 and is requested to determine if an existing record format can accurately describe the format of the records within the data so that the system can process the data. The system may analyze multiple records in the sample data to determine if the sample data matches any candidate record formats 606a-g in the record format repository 604. In some implementations the analysis may include attempting to parse the sample data using each of the candidate record formats 606a-g stored in a record format repository 604. In some implementations, parsing the data includes applying a candidate record format to the sample data to determine the sample values each field in each record. The sample values may be compared to the candidate record format to determine if they are consistent with those of the candidate record format. In some implementations, the analysis may include validating the values in the sample data against a validation test that defines valid values or a range of valid values established for the field by the candidate record format. For example, a field may allow a limited number of valid values (50 states, 2 genders, etc. . . . ).

For each record format, the system determines a measure of the success of the parsing, called a validation test. For example, in one exemplary validation test the system keeps a count of the number of records that were not successfully parsed. In another exemplary validation test the system keeps a count of the number of fields that were not successfully parsed as well as an indication of which fields could not be processed. The system narrows the record formats to a set of candidate record formats 606e, 606f, 606g and presents them to the user. In some implementations, the record format may not provide an exact match to the record format associated with the sample data. For example, candidate record format 606e ends with a string field, while the other candidate record formats end with a date field; however, since a string may be populated with a date value, the record format is still compatible with the sample data. Other parsing inconsistencies may also be tolerated. For example, for one test, values that fall outside a pre-defined range of valid values may still produce a candidate record format, for example, potential record format 606g contains a "marital status" field with valid values "M" and "S". The sample data set contains a field containing either an "M" or an "F". The system may include potential data record 606g while noting the parsing error. In some tests, a potential data record is included if the number of parsing errors is below a given threshold. In other tests, a potential data record is included if the number of valid parsed values exceeds a given threshold.

In some implementations, the system may present the candidate record formats to a user and permit the user to select the record format that fits the data. In this example, the user may select the candidate record format 606f as the best fit. In some implementations, the system may examine compatible record formats and make a determination about which record format is the best based on a profile of the sample data and the candidate record format. In some implementations, the user may modify the record format. Once the list of potential record formats is narrowed to a single target record format, the system validates the selected target record format by parsing the provided sample data 602. After the validation completes, the system associates the sample data with the selected target record format and stores the selected target record format and/or provides the selected target record format to the user. In some implementations, when the sample data does not conform to the data types provided in the record format, the user is presented with an option to modify the record format to cause it to be consistent with the sample data.

Figure 7:
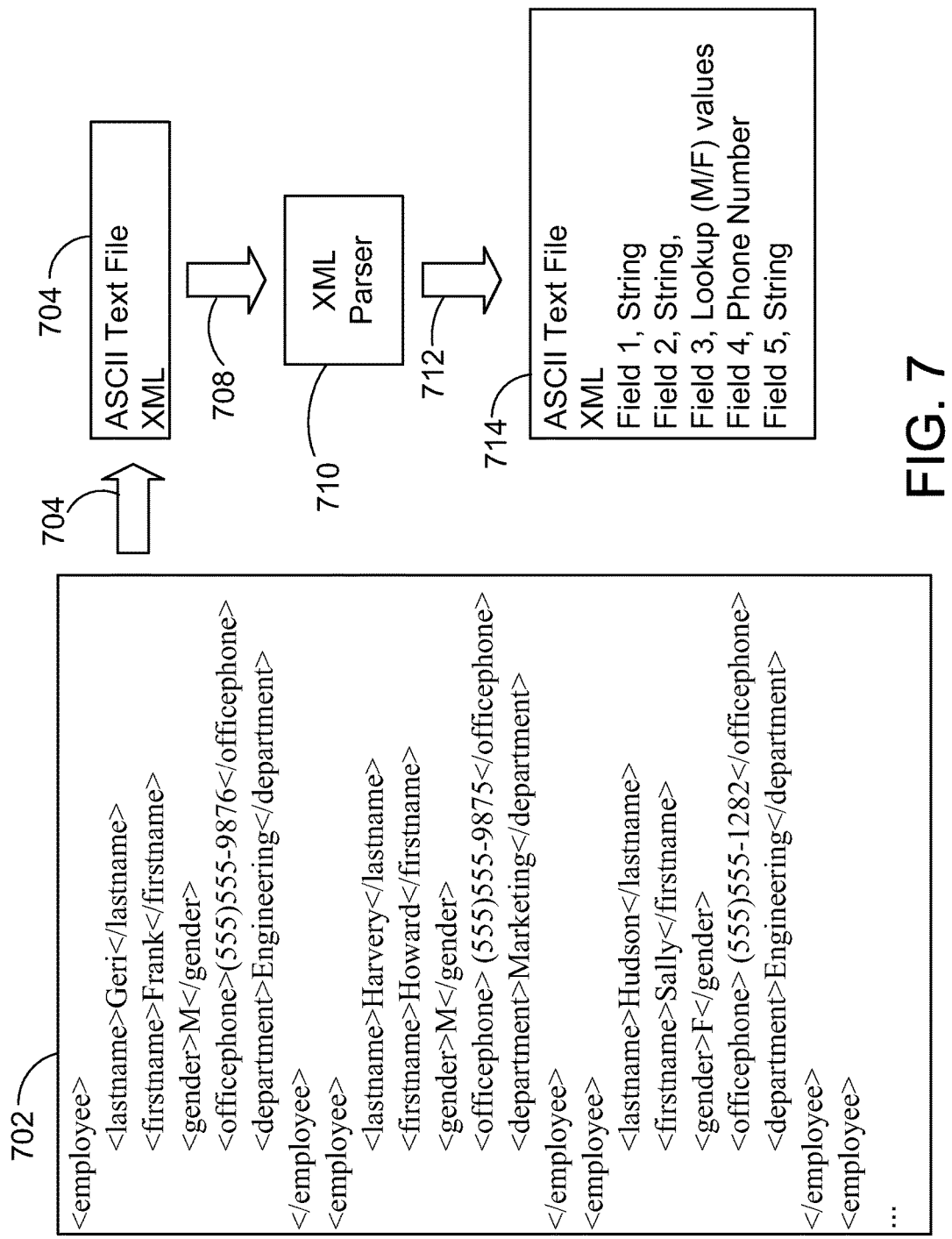
FIG. 7 is a block diagram showing exemplary processing of the pre-processing module generating a record format based on a parser.

In some implementations, referring to FIG. 7, the system cannot identify an existing record format in the record format repository 604 that fits the sample data. Under these circumstances, the system determines if an existing parser can parse the sample data provided. For example, a sample data set 702 is shown in an XML format. In this example the record format repository 604 does not contain any record format that matches the sample data. Represented by process arrow 704, the system identifies that the record format is an ASCII file in XML format. Represented by process arrow 708, the system determines that an existing parser (e.g., the XML parser 710) is capable of interpreting the data. Based on the parser and the sample data, the system derives the record format of the sample data 714. As discussed above, the system verifies the parser can interpret the sample data, associates the resulting target record format generated by the parser with the sample data 714, and stores the resulting target record format in the record format repository. In some implementations, the system presents the newly created target record format to the user for approval before storing the target record format in the record format repository.

Figure 8A:
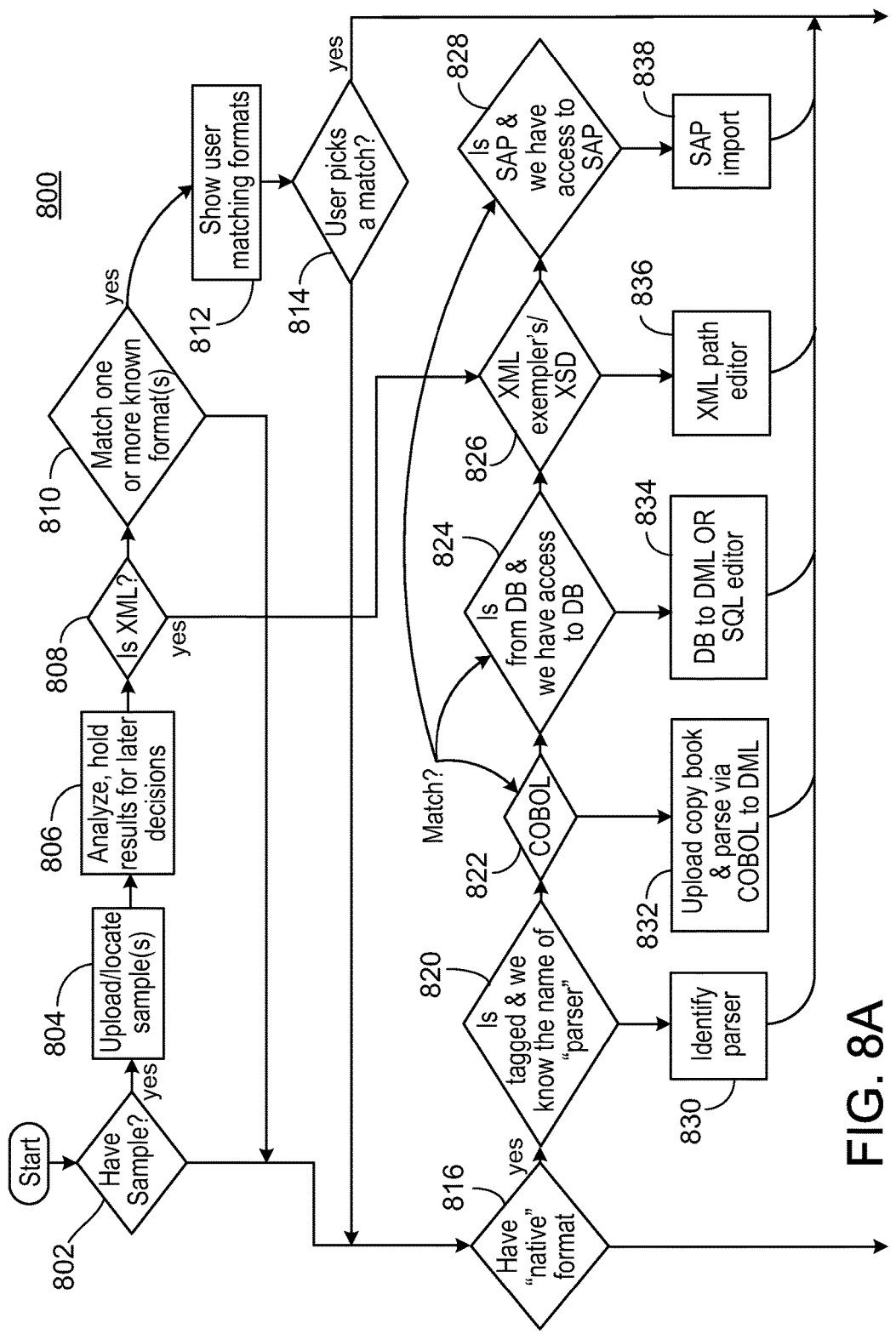
FIG. 8 is a flowchart for an exemplary procedure for managing record format information.
Figure 8B:
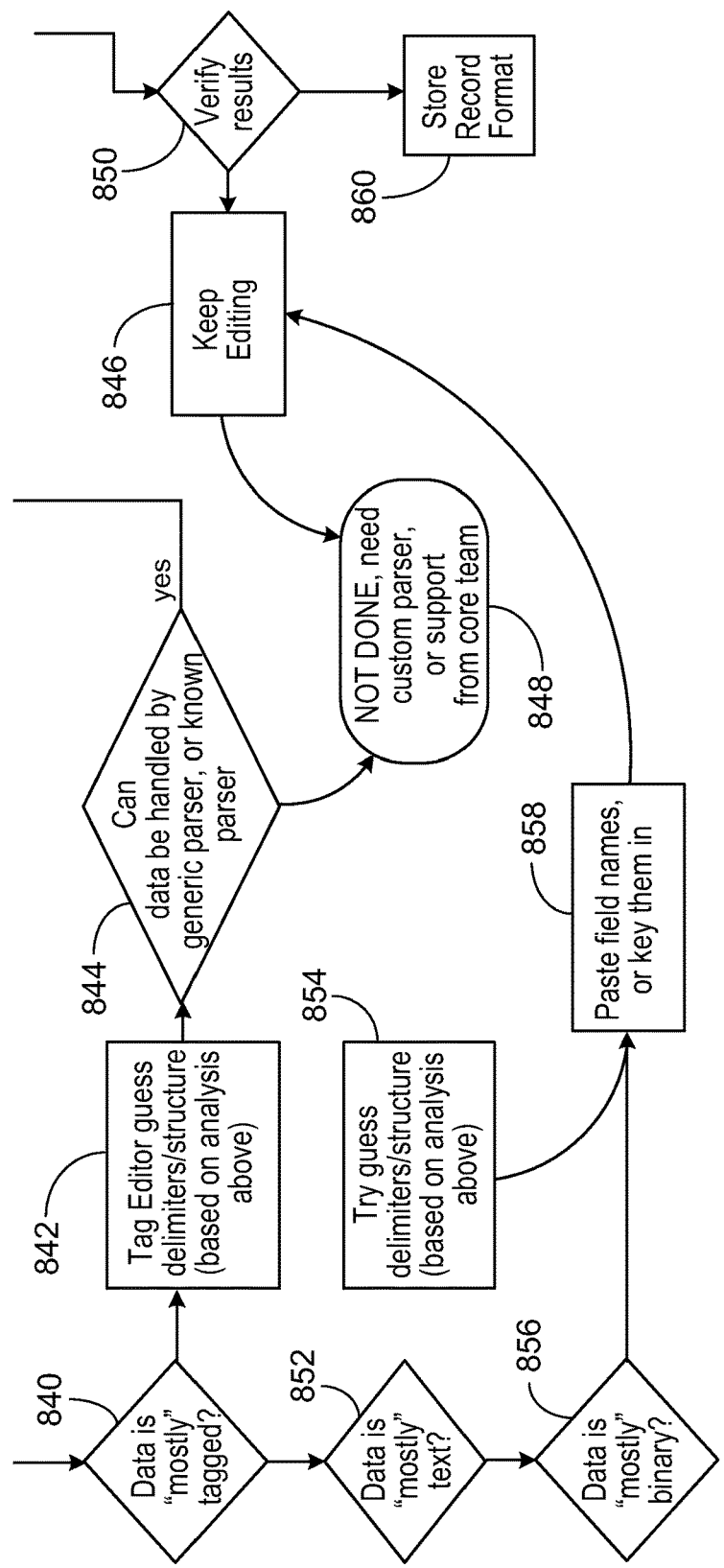

FIG. 8 shows a flowchart for another exemplary process 800 that the pre-processing module 106 can use to determine a target record format. Operations of the pre-processing module include determining if supplied input data includes sample data 802.

Operations also include uploading and/or locating the sample data 804 if the input data includes sample data. The pre-processing module may access the sample from a location defined by the input data. In some implementations, the pre-processing module may upload or access the sample data from another server via an access port. In other implementations, the pre-processing module may access a file or other data storage mechanism that contains the sample data.

Operations also include analyzing the sample data 806, and optionally storing the results of the analysis. The sample data may be analyzed to determine the character set, metadata, record format type and/or the record format itself. In some implementations, the system analyzes the sample data to determine whether or not to perform a search for one or more known record formats stored in a record format repository. For example, the pre-processing module may perform a search to determine the potential record format when the sample data is a first type (e.g., a comma separated file) but not upon determining that the sample data is a second type (e.g., XML). In other implementations, the sample data is analyzed to look for metadata that may aid in the creation and validation of the record format. In some implementations, the pre-processing module identifies field separators, escape characters, and a header containing field names. The results of the analysis may be retained for use in a later decision process.

In this implementation, operations include determining if the type of the document containing the sample data is XML 808. In some implementations, documents in one or more predetermined formats, such as XML format in this example, are treated separately from documents in other format. In this implementation, sample XML documents are processed by an XML parser 826.

Operations also include determining if the sample data matches one or more known record formats 810 stored in the record format repository. This may be accomplished, as discussed above, by validating one or more records in the sample data against each record format using validation tests and determining the number of validation errors. In other implementations, the information obtained while analyzing the sample data 806 may be used to reduce the number of data formats against which the sample data is validated.

Operations also include showing the user matching record formats 812. As discussed above, the pre-processing module may display a list of potentially matching record formats to the user.

Operations also include determining if the user selects a matching record format from the list of potential record formats 814.

Operations also include, if no match to a stored record format is found and/or selected by a user, determining if the sample data has a known data type, such as being included in a file that has a known native format 816 for which there is an available parser. A native format is a known external format used by an application or system.

Operations also include, if the native format is known, determining data match to an appropriate available parser. For example, the sample data may include tagged records that are able to be processed by a known parser 820.

Operations also include identifying the parser for the tagged sample data 830.

In this implementation, determining a match to an available parser includes determining if the sample data is in COBOL 822. In some implementations, operations may also include determining if the sample data is in another programming language which utilizes a standard data record format structure that can be parsed by an available parser.

Operations also include uploading and parsing the COBOL copybook 832 if the sample data is in COBOL.

Matching a known native format to another available parser includes determining that the sample data is stored in a database and validating that the pre-processing module may access the database. 824. Access to the database may include verifying that the pre-processing module has access to valid credentials, for example, a username and password. Access to the database may also include determining that the credentials provide access to the sample data.

Operations also include analyzing the sample data stored in the database and determining a record format from the analysis 834 (e.g., in an SQL editor). In some implementations, the pre-processing module analyzes the table structure of the database to derive the record format.

Matching a known native format to another available parser includes determining if the sample data is in XML format and if it contains a document type definition or an XML Schema Definition (XSD) 826.

Operations also include translating the structure of the XML document into a record format 836 (e.g., in an XML path editor).

Matching a known native format to another available parser o includes determining if the data is in an SAP format 828. In some implementations other enterprise solution software packages may be detected, for example, sample data from Oracle Financials.

Operations also include determining a record format using an import module for the enterprise software package 838.

If the data type of the sample data is not known or there is no available parser for the data type, operations include determining characteristics of the sample data and generating a constructed record format from an analysis of the characteristics of the sample data. For example, in this implementation, the operations include determining if the sample data is mostly tagged 840. Mostly tagged data is, for example, data that appears to predominately contain tagged data structures, but contains some data which does not necessarily conform to a tagged structure.

Operations also include attempting to process the data as tagged data 842 if the data is determined to be mostly tagged (e.g., using a tag editor). In addition to XML, other tagged formats may also be handled, for example Society for Worldwide Interbank Financial Telecommunication formats (SWIFT).

Operations also include determining if a generic tagged data parser, or a known parser is capable of processing the sample data 844.

Operations also include referring the sample data to a parser builder 848.

Operations also include determining that the sample data is mostly text 852. Mostly text data is, for example, data which is predominately encoded using a well known text format, for example ASCII or EBCDIC.

Operations also include attempting to determine the structure of the data 854. In some implementations, the structure of the data may be determined by identifying record and field delimiters. Record delimiters may be identified by examining the last character in the sample data. Delimiters may also be identified by examining the data for non-printing or non-alpha numeric characters. In cases where two non-printable characters or non-alpha numeric characters occur in the sample data, the most common may be the field delimiter and the less common, the record delimiter. The existence of a non-printable character which is not a delimiter may indicate the sample data is not delimited. After identifying delimiters, the pre-processing module may apply the delimiters to the sample data and check for inconsistencies. For example, the system may check if each record contains the same number of fields. The system may check if the same field in each record contains a similar or compatible data type. In some implementations, the pre-processing module relies on information determined about the data while analyzing the data 806.

Operations also include determining that the data is mostly binary 856. Binary data is, for example, data that is not encoded using well known text formats, for example ASCII and EBCDIC.

Operations also include inserting field names into the sample data 858 if appropriate (e.g., in response to determining that the data is mostly binary 856). In some implementations, a user can enter (e.g., paste or key in) field names to be inserted.

Operations also include verifying the results 850. Verifying a record format may include using the record format and attempting to parse sample data.

Operations also include allowing the user to edit the record format 846. In some implementations, the user may edit the record format and/or change the type, names, and structure of the sample data.

Operations also include storing the record format in a record format repository 860. In some implementations, the pre-processing module associates the data format with the sample data, in other implementations the pre-processing module creates a copy of the data format and associates the copy with the data.

The record format discovery approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for discovery of record formats of data records for processing in a data processing system, the method including:

receiving, by the data processing system from a data source, a data stream including plural distinct records that have a record format, with the records having fields that have data values; and selecting by the data processing system a record format that corresponds to the format of the data source, with the record format being one of a plurality of distinct candidate record formats, by:

accessing from storage the distinct candidate record formats, with each particular one of the distinct candidate record formats specifying a data type for each field of a group of one or more fields of that particular one of the distinct candidate record formats;

for each of two or more particular candidate record formats accessed, parsing data in each of multiple ones of the received, distinct records with a parser that applies, to the data, a data type for a field that is specified by the particular candidate record format;

for at least one of the two or more particular candidate record formats accessed, determining that the parser identifies one or more errors when attempting to parse data in at least one of the multiple ones of the received, distinct records; and responsive to that determination, storing results data that specifies the data type or the field that was not parsed; and for each of the two or more particular candidate record formats accessed, determining a measure of correspondence for the particular candidate record format based on an amount of data in each of the multiple ones of the received, distinct records that is successfully parsed by data types for those fields specified by the particular candidate record format, which measure of correspondence is based on an extent to which the particular candidate record format corresponds to the format of each of the multiple ones of the received, distinct records;

wherein the determined measure of correspondence for the at least one of the two or more particular candidate record formats accessed is further based on a number of one or more errors that the parser identifies for one or more data types of one or more corresponding fields specified by the at least one of the two or more particular candidate record formats, as specified by the stored results data for the at least one of the two or more particular candidate record formats; and wherein the selected record format has a higher or equivalent measure of correspondence, relative to one or more other measures of correspondence for one or more other distinct candidate record formats.

2. The method of claim 1, wherein a record is associated with a known file type.

3. The method of claim 2, wherein the file type corresponds to a file extension.

4. The method of claim 1, wherein the received, plural distinct records include first records, and the particular candidate record format includes a first candidate record format, and wherein the method further includes:

receiving second records that each have one or more values for respective fields over the input device or port; and associating a second candidate record format with the second records based on: applying validation tests to the second records and none of the validation tests applied to the second records determining at least a partial match to one or more of the candidate record formats, and not having a known data type associated with the second records.

5. The method of claim 1, further including:
recognizing tags in the data stream;
parsing the data stream to determine the multiple ones of the received, distinct records based on the recognized tags; and
generating a constructed record format based on the recognized tags in the data stream.

6. The method of claim 1, further including:
recognizing delimiters in the data stream;
parsing the data stream to determine the multiple ones of the received, distinct records based on the recognized delimiters; and
determining the record format from the parsed data stream.

7. The method of claim 1, further including:
generating a constructed record format from an analysis of characteristics of the data by recognizing that the data is in a binary form without tags or delimiters indicating values of multiple records; and
receiving one or more field identifiers from a user interface.

8. The method of claim 1, further including:
applying the particular candidate record format that corresponds to the format of the multiple ones of the received, distinct records to the received data stream to determine values for each of a plurality of fields in the multiple ones of the received, distinct records.

9. The method of claim 1, further including:
determining whether the received, distinct records match the particular candidate record format by:
analyzing values for the received, distinct records according to a validation test to determine whether a number of valid values is larger than a predetermined threshold.

10. The method of claim 9, wherein analyzing determined values for a first record of the received, distinct records according to the validation test includes performing a corresponding field test on each determined value for each field.

11. The method of claim 10, wherein performing a first field test on a determined value for a first field includes matching a number of characters in the determined value to a predetermined number of characters.

12. The method of claim 10, wherein performing a first field test on a determined value for a first field includes matching the determined value to one of multiple predetermined valid values for the first field.

13. The method of claim 10, wherein the number of valid values is based on a number of records for which the determined value for a given field passes the field test corresponding to the given field.

14. The method of claim 1 wherein for at least a first one of the candidate record formats accessed,
determining that the parser was unable to parse data in at least one of the multiple ones of the received, distinct records; and responsive to that determination,
logging in an error log an error entry that specifies the data type for the field that was not parsed.

15. The method of claim 14 wherein determining a measure of correspondence includes:
determining the measure of correspondence for the particular candidate record format based on a number of errors that are logged for the data types of corresponding fields specified by the particular candidate record format, as specified by the error log for the at least first one of the candidate record formats.

16. A computer-readable storage medium storing a computer program for discovery of record formats of data records for processing in a data processing system, the computer program including instructions for causing a computer to:

receive, from a data source, a data stream including plural distinct records that have a record format, with the records having fields that have data values; and select a record format that corresponds to the format of the data source, with the record format being one of a plurality of distinct candidate record formats, by:

accessing from storage the distinct candidate record formats, with each particular one of the distinct candidate record formats specifying a data type for each field of a group of one or more fields of that particular one of the distinct candidate record formats;

for each of two or more particular candidate record formats accessed, parsing data in each of multiple ones of the received, distinct records with a parser that applies, to the data, a data type for a field that is specified by the particular candidate record format;

for at least one of the two or more particular candidate record formats accessed, determining that the parser identifies one or more errors when attempting to parse data in at least one of the multiple ones of the received, distinct records; and responsive to that determination, storing results data that specifies the data type or the field that was not parsed; and for each of the two or more particular candidate record formats accessed, determining a measure of correspondence for the particular candidate record format based on an amount of data in each of the multiple ones of the received, distinct records that is successfully parsed by data types for those fields specified by the particular candidate record format, which measure of correspondence is based on an extent to which the particular candidate record format corresponds to the format of each of the multiple ones of the received, distinct records;

wherein the determined measure of correspondence for the at least one of the two or more particular candidate record formats accessed is further based on a number of one or more errors that the parser identifies for one or more data types of one or more corresponding fields specified by the at least one of the two or more particular candidate record formats, as specified by the stored results data for the at least one of the two or more particular candidate record formats; and wherein the selected record format has a higher or equivalent measure of correspondence, relative to one or more other measures of correspondence for one or more other distinct candidate record formats.

17. A computing system for discovery of record formats of data for processing in a data processing system, the computing system including:

an input port configured to receive from a data source a data stream that includes plural distinct records that each have a record format, with the records having fields that have data values; and at least one processor configured to:

select a record format that corresponds to the format of the data source, with the record format being one of a plurality of distinct candidate record formats, and further configured to:

access from a storage device the distinct candidate record formats, with each particular one of the distinct candidate record formats specifying a data type for each field of a group of one or more fields of that particular one of the distinct candidate record formats; and for each of two or more particular candidate record formats accessed, parse data in each of multiple ones of the received, distinct records with a parser that applies, to the data, a data type for a field that is specified by the particular candidate record format;

for at least one of the two or more particular candidate record formats accessed, determine that the parser identifies one or more errors when attempting to parse data in at least one of the multiple ones of the received, distinct records; and responsive to that determination, store results data that specifies the data type or the field that was not parsed; and for each of the two or more particular candidate record formats accessed, determine a measure of correspondence for the particular candidate record format based on an amount of data in each of the multiple ones of the received, distinct records that is successfully parsed by data types for those fields specified by the particular candidate record format, which measure of correspondence is based on an extent to which the particular candidate record format corresponds to the format of each of the multiple ones of the received, distinct records;

wherein the determined measure of correspondence for the at least one of the two or more particular candidate record formats accessed is further based on a number of one or more errors that the parser identifies for one or more data types of one or more corresponding fields specified by the at least one of the two or more particular candidate record formats, as specified by the stored results data for the at least one of the two or more particular candidate record formats; and wherein the selected record format has a higher or equivalent measure of correspondence, relative to one or more other measures of correspondence for one or more other distinct candidate record formats.

* * * * *

UNITED STATES PATENT AND TRADEMARK OFFICE
CERTIFICATE OF CORRECTION

PATENT NO. : 10,445,309 B2
APPLICATION NO. : 12/945094
DATED : October 15, 2019
INVENTOR(S) : David W. Parmenter et al.

Page 1 of 1

It is certified that error appears in the above-identified patent and that said Letters Patent is hereby corrected as shown below:

In the Claims

Column 16, Line 6, Claim 17, after "formats;", delete "and".

Signed and Sealed this
Seventeenth Day of December, 2019

Andrei Iancu
*Director of the United States Patent and Trademark Office*